US012630206B2

(12) United States Patent　　　　(10) Patent No.: US 12,630,206 B2
Lauver　　　　　　　　　　　　　　(45) Date of Patent: May 19, 2026

(54) LIFT SYSTEM AND METHOD FOR MOVING A METAL FRAME CABINET

(71) Applicant: Carl Lauver, Morrisville, PA (US)

(72) Inventor: Carl Lauver, Morrisville, PA (US)

( * ) Notice: Subject to any disclaimer, the term of this patent is extended or adjusted under 35 U.S.C. 154(b) by 361 days.

(21) Appl. No.: 17/846,422

(22) Filed: Jun. 22, 2022

(65) Prior Publication Data

US 2023/0415801 A1　　Dec. 28, 2023

(51) Int. Cl.
　　　*B62B 3/10*　　　　(2006.01)
　　　*B66F 5/04*　　　　(2006.01)
(52) U.S. Cl.
　　　CPC .................. *B62B 3/10* (2013.01); *B66F 5/04* (2013.01); *B62B 2202/30* (2013.01)
(58) Field of Classification Search
　　　CPC .......... B62B 3/10; B62B 2202/30; B66F 5/04
　　　See application file for complete search history.

(56) References Cited

U.S. PATENT DOCUMENTS

| | | | | |
|---|---|---|---|---|
| 2,903,258 | A * | 9/1959 | Jovanovich .......... | B25H 1/0007 248/176.1 |
| 2,906,497 | A | 9/1959 | Wolf | |
| 4,269,394 | A * | 5/1981 | Gray ....................... | B66F 13/00 254/134 |
| D301,655 | S * | 6/1989 | Otte .............................. | D34/31 |
| 5,271,603 | A | 12/1993 | White | |

| | | | | |
|---|---|---|---|---|
| 6,416,039 | B1 | 7/2002 | Pietrusynski | |
| 6,533,247 | B1 * | 3/2003 | Dhein .................. | B25H 1/0014 254/134 |
| 6,769,668 | B2 | 8/2004 | Siglock | |
| 6,966,542 | B2 | 11/2005 | Bettencourt | |
| 7,717,401 | B2 * | 5/2010 | Diaz ......................... | B66F 3/36 254/133 R |
| 9,415,982 | B1 | 8/2016 | Roovers et al. | |
| 10,737,920 | B2 * | 8/2020 | Renquist .................. | B66F 5/04 |
| 2002/0121632 | A1 | 9/2002 | Siglock | |
| 2005/0218384 | A1 | 10/2005 | Hernandez, Jr. et al. | |
| 2007/0235704 | A1 | 10/2007 | Paul | |
| 2008/0012259 | A1 * | 1/2008 | Desbiens .............. | B62B 3/0612 280/79.11 |
| 2017/0229852 | A1 * | 8/2017 | Jones .................... | F16M 13/022 |
| 2017/0282778 | A1 * | 10/2017 | Young, Jr. ................. | B62B 3/04 |

* cited by examiner

*Primary Examiner* — Seahee Hong

(74) *Attorney, Agent, or Firm* — LaMorte & Associates P.C.

(57)　　　　　ABSTRACT

A lifting assembly for lifting a metal cabinet that has parallel sheet metal walls along its base. The lifting system has a floor jack with wheels and a lift arm. The lift arm supports a lifting saddle. The lifting saddle contacts and lifts the metal cabinet. The lifting saddle has a base plate that is coupled to the lift arm. Adjustable crossbars are mounted to the base plate. The crossbars terminate with slotted heads. The slots are sized to receive sheet metal walls. The slots prevent the sheet metal walls from buckling in the area of contact. The crossbars are adjusted in length to set the slotted heads at a distance apart equal to that of the parallel sheet metal walls. The lifting saddle is maneuvered under the sheet metal walls, wherein the sheet metal walls are received within the slotted heads on the crossbars.

13 Claims, 6 Drawing Sheets

LIFT SYSTEM AND METHOD FOR MOVING A METAL FRAME CABINET

BACKGROUND OF THE INVENTION

1. Field of the Invention

In general, the present invention relates to the structure of wheeled floor jacks. More particularly, the present invention relates to specialized floor jacks that have lifting arms configured to lift a specific type of item.

2. Prior Art Description

Electronic equipment is often kept in metal cabinets. For example, computer blade servers are designed to be used on a metal server rack. A metal cabinet enables electronic equipment to be arranged in an ergonomically efficient manner, while providing wire management, power management and ventilation. Metal cabinets can also be grounded to prevent static discharge from effecting the electronic equipment being retained.

Some electronic cabinets can hold hundreds of pounds of electronic equipment. Furthermore, all of that equipment is typically connected to wiring that is bundled into cables and affixed to the metal cabinet. Accordingly, once electronic equipment is installed into a metal cabinet, the metal cabinet becomes exceedingly difficult to move. A metal cabinet filled with electronic equipment is typically too heavy to be manually carried. Furthermore, the metal cabinet and the electronic equipment it holds are too fragile to be strapped to a hand cart or dolly. Accordingly, if a metal cabinet filled with electronic equipment is to be safely moved, the electronic equipment must first be removed from the metal cabinet. The metal cabinet and electronic equipment are often separately moved to the new location and reassembled. This is a very difficult and time-consuming activity. Furthermore, such a moving technique requires that all the electronic equipment being moved be made unavailable for use for many hours or even days.

In the real-life applications, metal cabinets of electronic equipment are frequently moved. Sometimes the moves are large, like from one building to another. However, most of the time, the moves are small. Cabinets of electronic equipment are often rearranged in a room to make space for new equipment. Cabinets of electronic equipment are often moved temporarily to make room for the passage of other equipment. Furthermore, cabinets of electronic equipment are moved to provide access to floor panels, power cables, ventilation ducts and the like.

In theory, a metal cabinet filled with electronic equipment can be moved using a lifting device, such as a wheeled floor jack. In the prior art, there are many types of floor jacks that can provide the lifting power needed to lift the weight of a fully loaded cabinet of electronic equipment. However, such floor jacks are designed to lift rugged objects, such as cars, motorcycles or loaded pallets. Such prior art floor jacks are exemplified by U.S. Pat. No. 6,416,039 to Pietrusynski and U.S. Patent Application Publication No. 2005/0218384 to Hernandez. Although such floor jacks have the strength to lift and move cabinets of electronic equipment, they cannot be used in the present scenario. Metal cabinets used to support electronic equipment are primarily made of sheet metal. Such cabinets have very little internal structure. Accordingly, there is no underlying framework that can be engaged by a traditional floor jack. If a traditional floor jack is positioned to engage the sheet metal, the weight of the full cabinet concentrates at the points of contact and the sheet metal would buckle, therein damaging the metal cabinet and/or causing the metal cabinet to topple.

A need therefore exists for a lifting system that is specifically designed to engage and lift a metal cabinet from below without damaging the structure of the metal cabinet. A need also exists for a lifting system that can be used to move a full metal cabinet once lifted. These needs are met by the present invention as described and claimed below.

SUMMARY OF THE INVENTION

The present invention is a lifting assembly for lifting an object, such as a blade server cabinet, that has parallel sheet metal walls along its base. The lifting system has a floor jack with a frame, wheels for supporting the frame and a lift arm. The lift arm is raised and lowered by a hydraulic cylinder. The lift arm supports a lifting saddle. The lifting saddle contacts and lifts the sheet metal object.

The lifting saddle has a base plate that is coupled to a second end of the lift arm. Two or more adjustable crossbars are mounted to the base plate. The crossbars terminate with slotted heads that define slots. The slots are sized to receive sheet metal walls. Once received, the slots prevent the sheet metal walls from buckling in the area of contact.

The crossbars are adjusted in length to set the slotted heads at a distance apart equal to that of the parallel sheet metal walls. The lifting saddle is maneuvered under the sheet metal walls, wherein the sheet metal walls are received within the slotted heads on the crossbars. The lifting saddle is then raised with the floor jack. Once raised, the full lifting system can be rolled to move the sheet metal object without damage.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention lifting system can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered as limiting when interpreting the scope of the claims.

Figure 1:
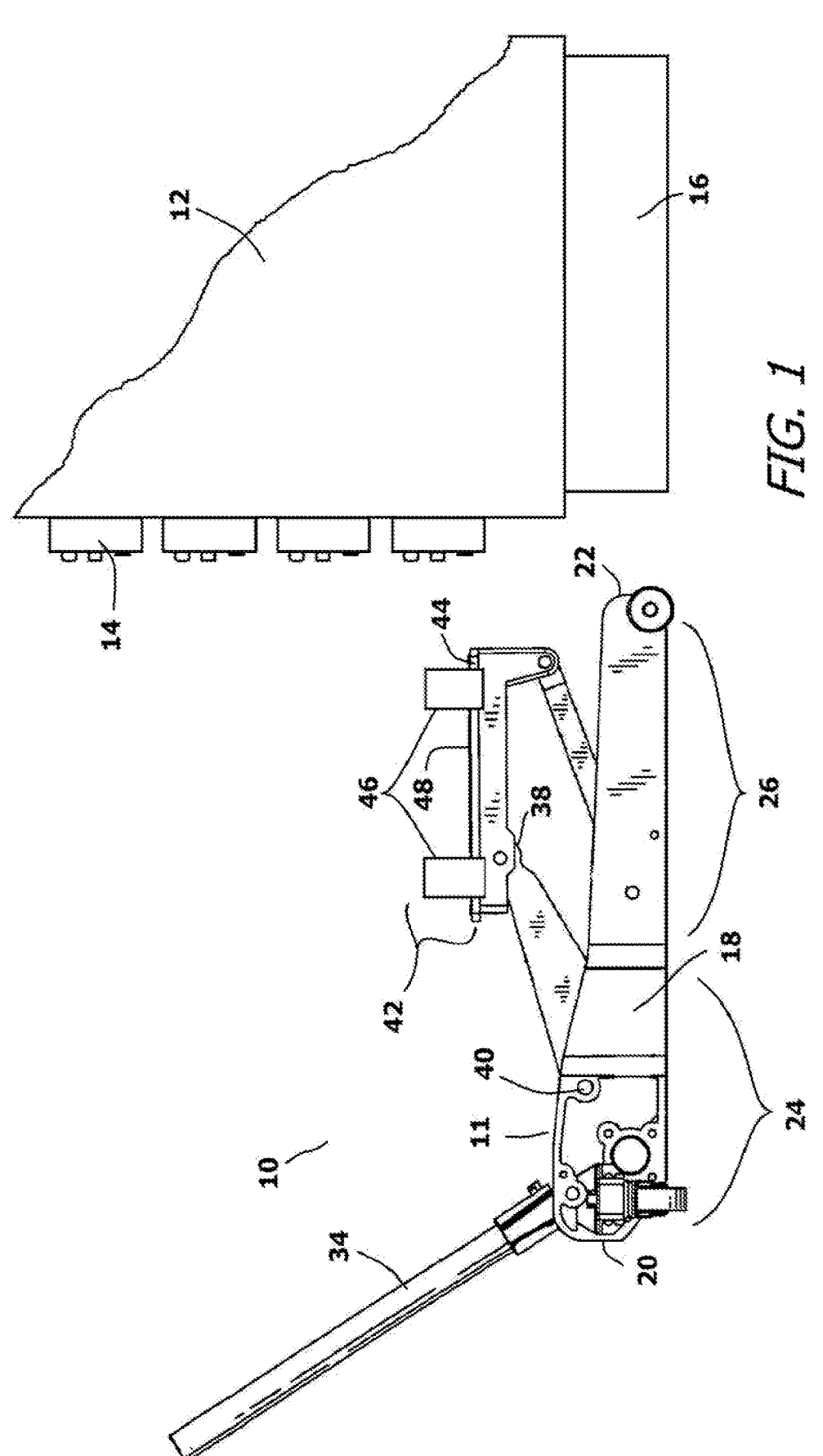
FIG. 1 shows a side view of an exemplary embodiment of a lifting system.
Figure 2:
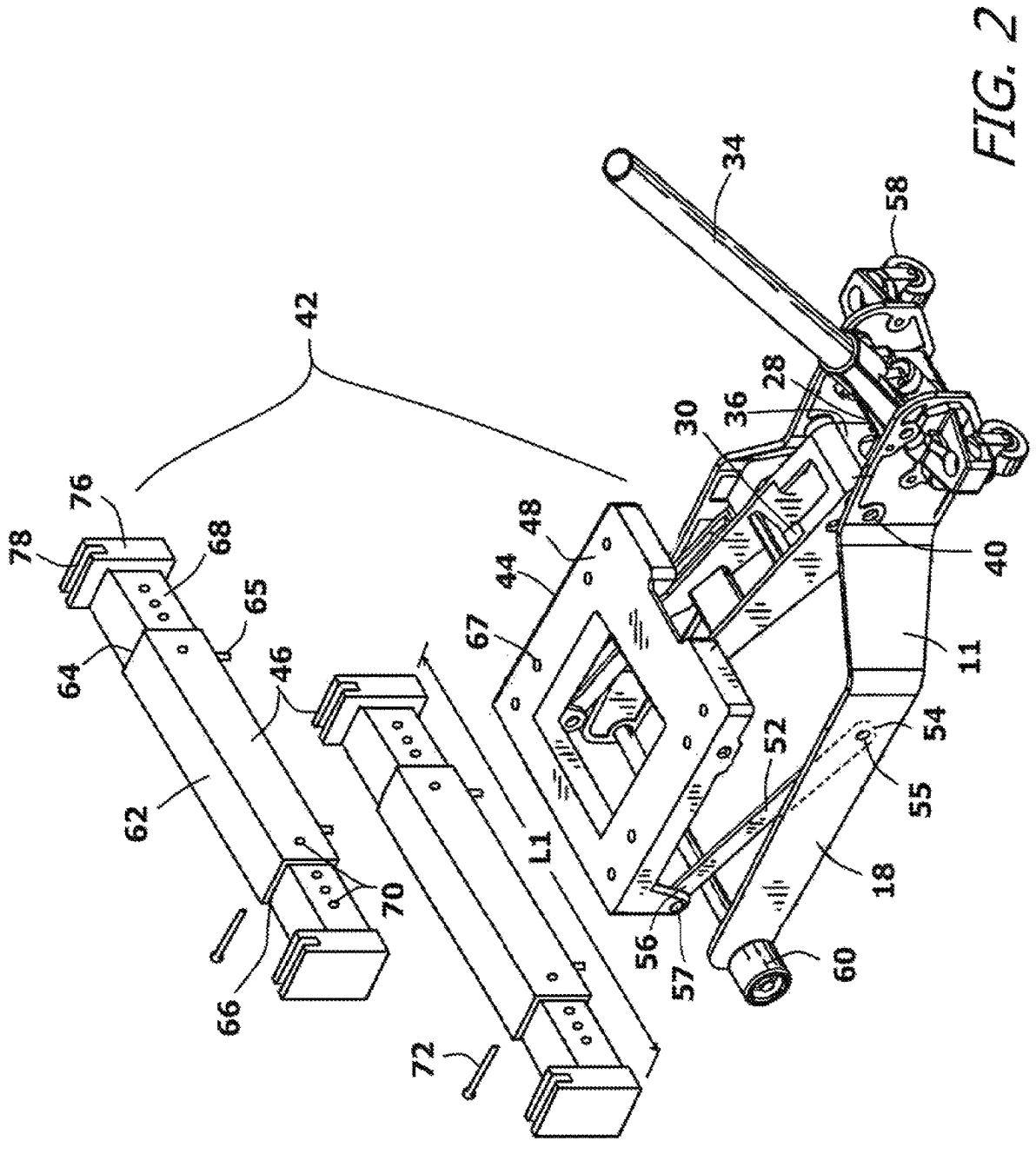
FIG. 2 shows a perspective view of the exemplary lifting system shown in FIG. 1.

Referring to FIG. 1 in conjunction with FIG. 2, a lifting system 10 is shown that is specifically designed to lift and move metal cabinets 12 of the type that are used to hold electronic equipment 14. Metal cabinets 12 for electronic equipment 14 are typically made of sheet metal. Accordingly, the metal cabinet 12 has four walls of sheet metal along the periphery of its base. The four walls include two sets of parallel walls 16, namely parallel front and back walls and parallel side walls. As will be explained, the lifting system 10 engages a set of the parallel walls 16 in a manner that can support the weight of the full metal cabinet 12 and without damaging the thin sheet metal forming the parallel walls 16.

The lifting device 10 is an assembly of a specialized floor jack 11 and a specialized lifting saddle 42. The floor jack 11 has a frame 18 that is supported on wheels. The frame 18 has a first end 20 and an opposite second end 22. The frame 18 has a narrow section 24 that begins at the first end 20. The narrow section 24 expands into a wide section 26 that terminates at an opposite second end 22. The wide section 26 is preferably at least twice as wide as the narrow section 24 for a reason that is later explained.

The narrow section 24 of the frame 18 surrounds and supports a pump 28, hydraulic cylinder 30 and the base of a lift arm 32. The hydraulic cylinder 30 is controlled by the pump 28. The pump 28 is manually operated by levering a handle 34 that can be selectively attached to the pump 28. The lift arm 32 has a first end 36 and an opposite second end 38. The lift arm 32 is attached to the narrow section 24 of the frame 18 at a first pivot connection 40. The hydraulic cylinder 30 moves the lift arm 32. As the hydraulic cylinder 30 expands, the hydraulic cylinder 30 causes the second end 38 of the lift arm 32 to rotate up out of the frame 18. As a result, the second end 38 of the lift arm 32 changes in elevation as the pump 28 expands the hydraulic cylinder 30. The second end 38 of the lift arm 32 supports a specialized lifting saddle 42 that rises and falls with the second end 38 of the lift arm 32.

The floor jack 11 selectively lifts and lowers a lifting saddle 42. The lifting saddle 42 includes a base plate 44 and adjustable crossbars 46. Initially, the base plate 44 rests in the wide section 26 of the frame 18. As such, the base plate 44 is wide, but no wider than the wide section 26 of the frame 18. The base plate 44 has a flat top surface 48. The base plate 44 is attached to the second end 38 of the lift arm 32 at a second pivot connection 50. Two stabilizing linkages 52 are provided. The stabilizing linkages 52 each have a first end 54 that is connected to the frame 18 at a first pivot joint 55, and a second end 56 that attaches to the base plate 44 with a second pivot joint 57. The stabilizing linkages 52 are positioned and sized to constantly maintain the base plate 44 in a horizontal orientation as the base plate 44 changes elevations. That is, the flat top surface 48 of the base plate 44 always remains horizontal as the lift arm 32 raises and lowers the base plate 44.

Wheels that support the frame 18 on the ground and enable the overall lifting system 10 to roll. The wheels include a set of castor wheels 58 and a set of fixed wheels 60. The caster wheels 58 are positioned at the first end 20 of the frame 18. The fixed wheels are positioned at the second end 22 of the frame 18. The fixed wheels 60 are positioned on the outside of the wide section 26 of the frame 18. As such, the fixed wheels 60 are widely spaced and provide a stable support under the wide section 26 of the frame 18.

Figure 3:
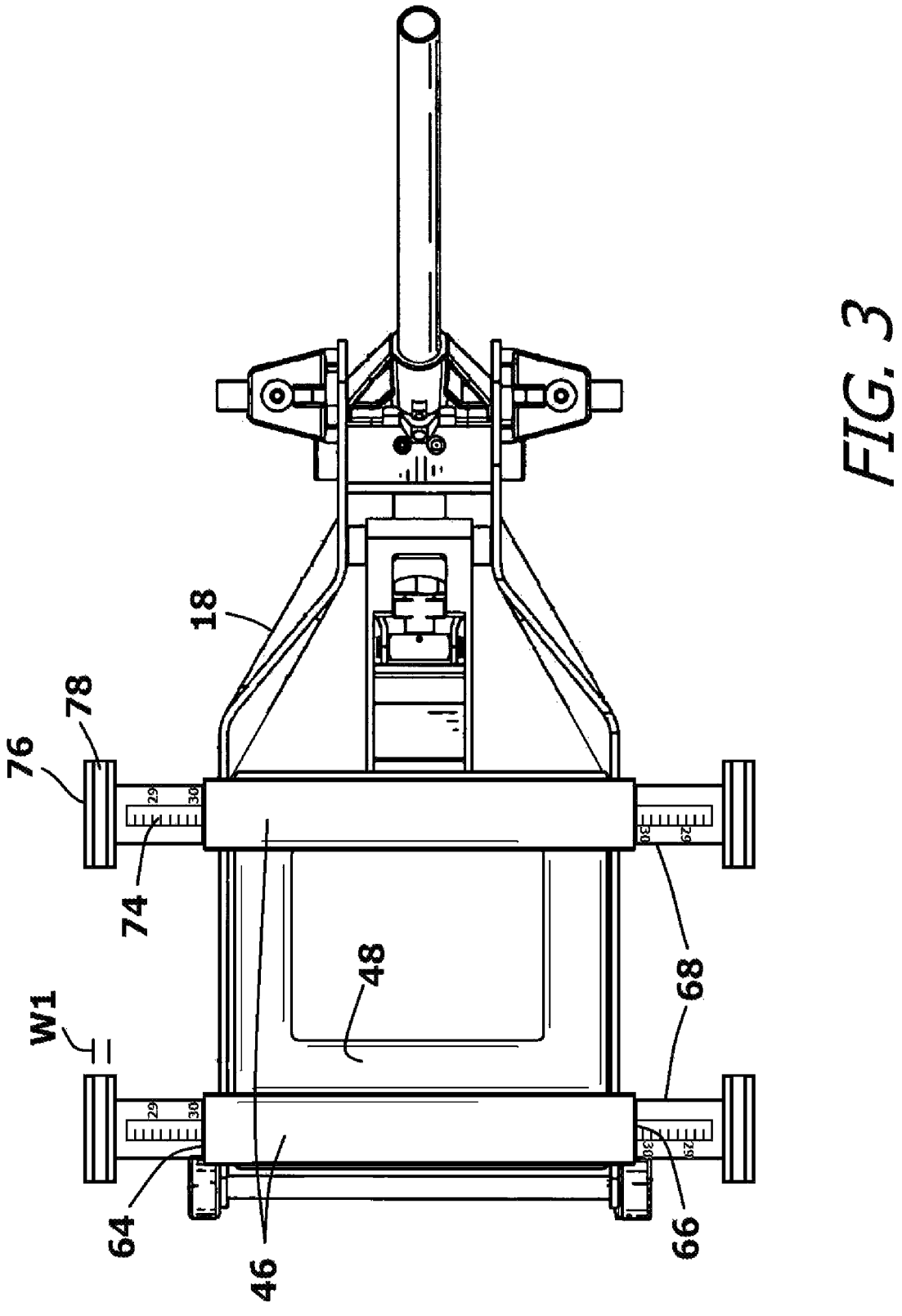
FIG. 3 shows a top view of the crossbar assemblies used in the exemplary lifting system.

Referring to FIG. 3 in conjunction with FIG. 1 and FIG. 2, it can be seen that within the lifting saddle 42, the base plate 44 supports at least two of the adjustable cross-bars 46. Each of the crossbars 46 has a center tube 62 that is positioned atop the base plate 44. The center tubes 62 can be mounted to the base plate 44. However, it is preferred that the crossbars 46 be detachable. In the shown embodiment, the cross tubes 62 have pegs 65 that selectively engage holes 67 in the base plate 44.

The center tubes 62 are horizontally oriented and remain horizontally oriented as the base plate 44 is raised and lowered. The center tubes 62 are wider than the underlying wide section 26 of the frame 18. Accordingly, although the base plate 44 can descend into the wide section 26 of the frame 18, the center tubes 62 cannot. Rather, when the lifting system 10 is fully retracted, the center tubes 62 contact, and rest atop, the wide section 26 of the frame 18.

Each center tube 62 as two open ends 64, 66. Extender arms 68 are provided that extend into the open ends 64, 66. The extender arms 68 are free to move laterally into, and out of, the center tubes 62. As the extender arms 68 telescope into and out of the center tubes 62, the overall length L1 of the adjustable crossbars 46 can be selectively altered. Holes 70 are formed in both the center tubes 62 and the extended arms 68. The holes 70 enable a locking pin 72 to pass through the center tubes 62 and the extender arms 68, therein creating a locking mechanism that locks the adjustable crossbars at a selected length.

The extender arms 68 and the interior of the center tubes 62 are preferably square or some other non-round shape. In this manner, the extender arms 68 cannot rotate within the center tubes 62 as they telescope to different lengths. In addition, measurement markings 74 are provided on the extender arms 68. The measurement markings 74 enable a person to determine the overall length L1 of each adjustable crossbar 46 before the locking pins 72 are used to maintain that length L1.

Each of the extender arms 68 terminate with a slotted head 76. Each slotted head 76 contains a vertical slot 78 that is accessible from the top of the slotted head 76. The vertical slot 78 has a uniform width W1, which is slightly wider than the sheet metal forming the parallel walls 16 of the metal cabinet 12. The vertical slots 78 have flat bottoms that are parallel to the flat top surface 48 of the base plate 44.

Figure 4:
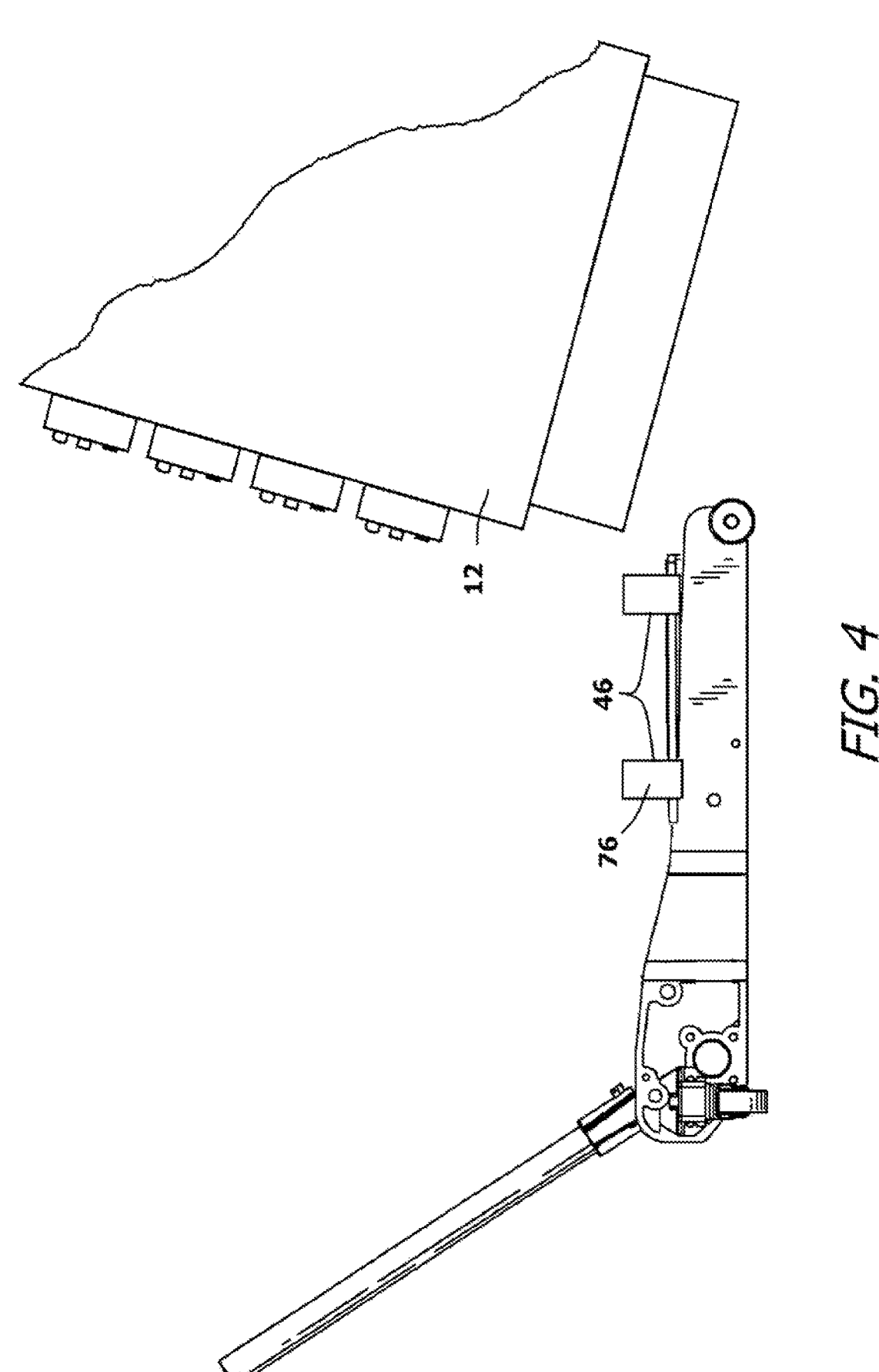
FIG. 4 shows a metal cabinet being positioned for lifting by the exemplary lifting system.
Figure 5:
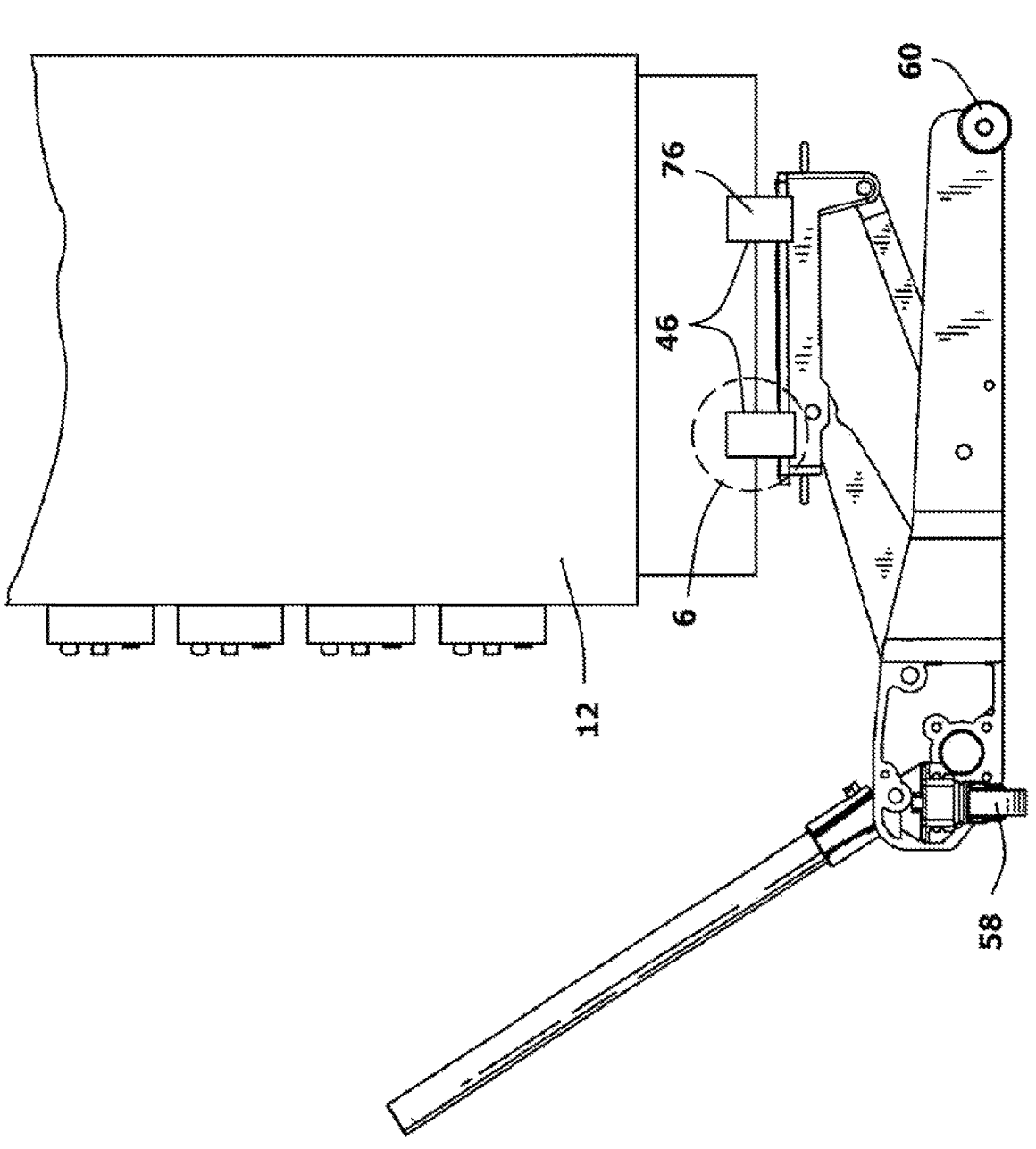
FIG. 5 shows a metal cabinet fully lifted by the exemplary lifting system.

Referring to FIG. 4 and FIG. 5 in conjunction with FIG. 2 and FIG. 3, it can be seen that the length L1 of the adjustable crossbars 46 are set to match the distance between a set of parallel walls 16 on the base of a metal cabinet 12. If there is room under the metal cabinet, the crossbars 46 can be advanced under the metal cabinet 12. The crossbars 46 can be temporarily removed for easier access, wherein the crossbars 46 are added under the metal cabinet 12. Alternatively, the metal cabinet 12 is tilted to enable the slotted heads 76 to engage the bottom of the metal cabinet 12. The metal cabinet 12 is then tilted back to its vertical orientation, wherein the metal cabinet 12 rests atop the adjustable crossbars 46.

Figure 6:
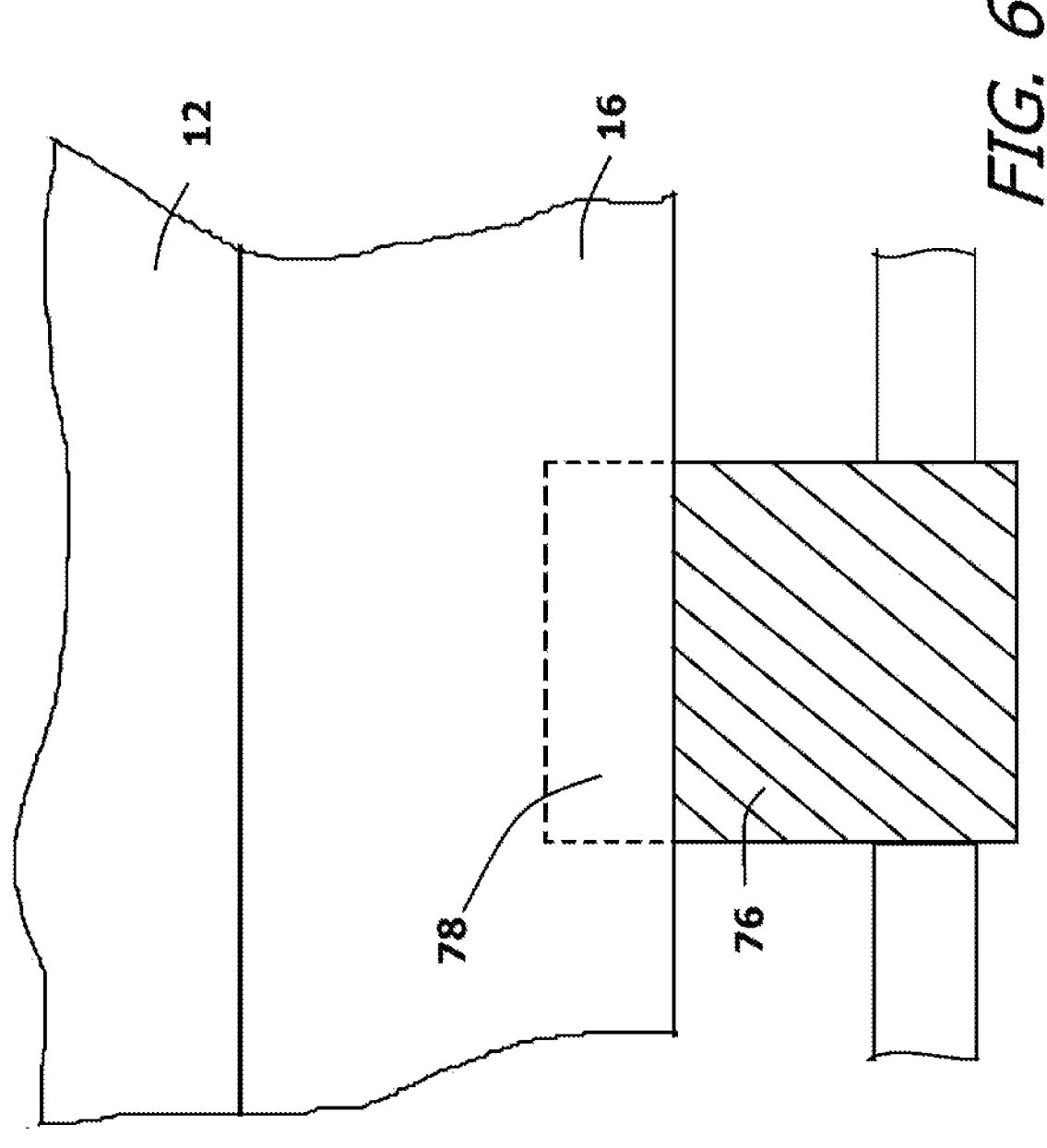
FIG. 6 show an enlarged fragmented view of a slotted head supporting a segment of a metal cabinet.

Referring to FIG. 6, it can be seen that the sheet metal walls 16 of the metal cabinet 12 pass into the vertical slots 78 in the slotted heads 76. The sheet metal walls 16 rest on the bottom of the vertical slot 78. Since the vertical slot 78 is only slightly wider than the sheet metal wall 16, the sides of the vertical slot 78 prevent the sheet metal wall 16 from buckling. The result is that the full weight of a loaded metal cabinet 12 can be borne by the slotted heads 76 and the adjustable crossbars 46 without damaging the sheet metal of the metal cabinet 12.

Returning to FIG. 5, it will be understood that once the metal cabinet 12 is supported by the adjustable crossbars 46, the full lifting system 10 can be rolled on its wheels 58, 60. The result is that the full metal cabinet 12 can be lifted and transported without having to unload the metal cabinet 12 or undo the wiring infrastructure used to interconnect devices within the metal cabinet 12.

It will be understood that the embodiment of the present invention that is illustrated and described is merely exemplary and that a person skilled in the art can make many variations to that embodiment. For instance, the number of adjustable crossbars and slotted heads can be increased. All such embodiments are intended to be included within the scope of the present invention as defined by the claims.

What is claimed is:

1. A lifting assembly for lifting a cabinet having a base with periphery defined by two sets of parallel sheet metal walls, wherein each of said sheet metal walls has a first thickness, said lifting assembly comprising:

a frame;

wheels for supporting said frame;

a lift arm having a first end and an opposite second end, wherein said lift arm is attached to said frame at a pivot connection;

a hydraulic cylinder that contacts said lift arm and selectively rotates said lift arm about said pivot connection;

a base plate coupled to said second end of said lift arm, crossbars mounted to said base plate, wherein said crossbars terminate with slotted heads that contain vertical slots of a uniform width, wherein said uniform width of each of said vertical slots is sized to receive said first width of said sheet metal walls therein, and said uniform width of each of said vertical slots is sized to support said sheet metal walls and prevent said sheet metal walls from buckling within said vertical slots.

2. The assembly according to claim 1, wherein said crossbars each have two opposed ends, wherein both of said opposed ends terminate with said slotted heads.

3. The assembly according to claim 2, wherein each of said crossbars has a length between said opposed ends, wherein said length is selectively adjustable.

4. The assembly according to claim 3, wherein each of said crossbars has a center tube and extender arms that telescope into said center tube, wherein said extender arms support said slotted heads.

5. The assembly according to claim 4, further including locking pins that extend through said center tube and said extender arms to selectively lock said extender arms in fixed positions relative to said center tube.

6. The assembly according to claim 4, further including markings on said extender arms that provide an indication of distance between said slotted heads on said extender arms.

7. The assembly according to claim 4, wherein each said center tube and said extender arms are configured to prevent said extender arms from rotating within said center tube.

8. A lifting saddle assembly for use on a floor jack to lift a cabinet with a base periphery defined by sheet metal walls, wherein each of said sheet metal walls has a first thickness, and wherein the floor jack selectively lifts and lowers said lifting saddle assembly, said lifting saddle assembly comprising:

a base plate that is raised and lowered by said floor jack;

crossbars connected to said base plate in parallel, wherein said crossbars have a length between two opposed ends, wherein said length is selectively adjustable; and slotted heads that terminate said crossbars at said opposed ends, wherein said slotted heads defines open vertical slots that are sized to receive said first width of said sheet metal walls therein, and wherein said open vertical slots are sized to support said sheet metal walls and prevent said sheet metal walls from buckling within said open vertical slots.

9. The assembly according to claim 8, wherein each of said crossbars has a center tube and extender arms that telescope into said center tube, wherein said extender arms support said slotted heads.

10. The assembly according to claim 9, further including locking pins that extend through said center tube and said extender arms to selectively lock said extender arms in fixed positions relative to said center tube.

11. The assembly according to claim 9, further including markings on said extender arms that provide an indication of distance between said slotted heads on said extender arms.

12. The assembly according to claim 9, wherein each said center tube and said extender arms are configured to prevent said extender arms from rotating within said center tube.

13. A method of lifting a cabinet having sheet metal walls that are separated by a given width, said method comprising the steps of:

providing a floor jack having a lifting saddle, wherein said lifting saddle has adjustable crossbars with slotted heads that contain vertical slots of a uniform width, wherein said uniform width of each of said vertical slots is just sized to receive one of said sheet metal walls therein, and said uniform width of each of said vertical slots is sized to support one of said sheet metal walls and prevent said sheet metal walls from buckling within said vertical slots;

adjusting said adjustable crossbars to set said slotted heads at a distance apart equal to said given width of said sheet metal walls;

tilting said cabinet and advancing said lifting saddle under said cabinet;

lowering said cabinet onto said lifting saddle wherein said sheet metal walls are received within said vertical slots of said slotted heads on said crossbars; and raising said lifting saddle and said cabinet with said floor jack.

* * * * *